(12) United States Patent
Hostiuc et al.

(10) Patent No.: US 10,860,793 B2
(45) Date of Patent: Dec. 8, 2020

(54) METHOD AND SYSTEM FOR AN ELECTRONIC DOCUMENT FRAMEWORK

(71) Applicant: SAP SE, Walldorf (DE)

(72) Inventors: Monica Hostiuc, Heidelberg (DE); Vitor Eduardo Seifert Bazzo, St. Leon Rot (IT); Eleonora Vidal, Bensheim (DE); Vipin Shivashankaran, Bangalore (IN); Aalbert de Niet, Bammental (DE); Gabor Nagy, Heidelberg (DE); Elzbieta Lacka-Zalewska, Angelbachtal (DE); Simon Tacke, Heidelberg (DE); Jose Herrerias, Malaga (ES); Daniel Hidalgo, Malaga (ES); Silvia Goetz, Speyer (DE); Nicole Berchtold, Karlsbad (DE)

(73) Assignee: SAP SE, Walldorf (DE)

( * ) Notice: Subject to any disclaimer, the term of this patent is extended or adjusted under 35 U.S.C. 154(b) by 449 days.

(21) Appl. No.: 14/858,811

(22) Filed: Sep. 18, 2015

(65) Prior Publication Data
US 2017/0039175 A1 Feb. 9, 2017

(30) Foreign Application Priority Data

Aug. 5, 2015 (IN) ............................ 4072/CHE/2015

(51) Int. Cl.
*G06F 17/00* (2019.01)
*G06F 40/197* (2020.01)
(Continued)

(52) U.S. Cl.
CPC .......... *G06F 40/197* (2020.01); *G06F 40/106* (2020.01); *G06F 40/123* (2020.01); *G06F 40/14* (2020.01)

(58) Field of Classification Search
CPC .. G06F 3/1287; G06F 17/2288; G06F 40/197; G06F 40/123
(Continued)

(56) References Cited

U.S. PATENT DOCUMENTS 5,629,846 A * 5/1997 Crapo ................... G06F 17/211
708/705
6,623,529 B1 * 9/2003 Lakritz ............... G06F 17/2288
707/E17.109

(Continued)

OTHER PUBLICATIONS

Microsoft, Electronic reporting (ER) overview, published Jul. 25, 2019, Microsoft, pp. 1-25(pdf).*

*Primary Examiner* — Manglesh M Patel
(74) *Attorney, Agent, or Firm* — Jones Day

(57) ABSTRACT

Methods and systems providing for the generation, sending, updating, and monitoring of electronic documents (eDocuments) based on source documents created in Enterprise Resource Planning (ERP) software. An eDocument is generated based on existing source documents, external data, or from other eDocuments. The method and systems ensure that the generated eDocument is compliant with any technical requirements. The eDocument is generated using a document process which transforms a non-compliant source document into a compliant eDocument. An eDocument Framework system can include a mapping application, application interface framework (AIF), an eDocument interface, and a process manager. The AIF is configured to interact with a cloud services provider to create a highly automated process of generating, sending, updating, and monitoring the eDocuments. The cloud service provider is also configured to interact with local authorities. The eDocument Framework system can also include a partner connector to interface with a business partner.

20 Claims, 13 Drawing Sheets

(51) Int. Cl.
*G06F 40/14* (2020.01)
*G06F 40/106* (2020.01)
*G06F 40/123* (2020.01)

(58) Field of Classification Search
USPC ........................................ 715/229, 200, 255
See application file for complete search history.

(56) References Cited

U.S. PATENT DOCUMENTS

| | | | | |
|---|---|---|---|---|
| 7,926,064 | B2* | 4/2011 | Fernandez | G06F 16/258 |
| | | | | 719/313 |
| 8,086,952 | B2* | 12/2011 | Edd | G06F 16/958 |
| | | | | 715/229 |
| 9,330,073 | B2* | 5/2016 | Rogers | G06F 17/227 |
| 9,342,505 | B2* | 5/2016 | Wu | G06F 17/2836 |
| 9,361,294 | B2* | 6/2016 | Smith | G06F 17/289 |
| 2002/0156839 | A1* | 10/2002 | Peterson | G06Q 30/02 |
| | | | | 709/203 |
| 2004/0268306 | A1* | 12/2004 | Cheng | G06F 17/2247 |
| | | | | 717/114 |
| 2010/0286977 | A1* | 11/2010 | Chin | G06F 17/289 |
| | | | | 704/4 |
| 2011/0046939 | A1* | 2/2011 | Balasaygun | G06F 9/543 |
| | | | | 704/2 |
| 2013/0117376 | A1* | 5/2013 | Filman | G06F 17/2288 |
| | | | | 709/205 |
| 2013/0226798 | A1* | 8/2013 | Orttung | G06Q 20/027 |
| | | | | 705/44 |
| 2014/0164315 | A1* | 6/2014 | Golshan | G06F 17/30011 |
| | | | | 707/608 |
| 2014/0280704 | A1* | 9/2014 | Ongg | H04L 67/10 |
| | | | | 709/217 |
| 2015/0135300 | A1* | 5/2015 | Ford | G06F 16/93 |
| | | | | 726/11 |

* cited by examiner

600

Create and Submit eDocument

Selection Parameters      601
     Company Code    _____ (Search)

eDocuments (All Types)    602
☒ Select by eDocument data
- eDocument GUID    _____ to _____
- Source Type    _____ to _____
- eDocument Type    _____ to _____
- Created By (User)    _____ to _____
- Creation Date    _____ to _____

(609 →)

eDocuments (Billing Documents)    603
☐ Select eDocuments created from Billing Documents
- Billing Document    _____ to _____
- Billing data    _____ to _____ eDocuments (Accounting Documents)    604
☐ Select eDocuments created from Accounting Documents
- Document Number    _____ to _____
- Fiscal Year    _____ to _____
- Posting Date    _____ to _____ eDocuments (Delivery Documents)    605
☐ Select eDocuments created from Delivery Documents
- Delivery    _____ to _____
- Act. Gov. Mvmnt Date    _____ to _____

Other Options for eDocuments    606
☐ Successfully Processed
☐ With Errors
☒ Not yet Created
☒ Not yet Sent to Interface
☐ eDocument not relevant ☐ Automatically send pending eDocuments to the Interface

AP User Interface — [Refresh] [Create] [Submit] [Tax Authorities] [Customer] [Export File] [History] [Status]

| eDocument GUID | Status | Country Code | Country | Source Type | eDocument Source Key | eDoc Type | eDoc Status | Log. System | Changed On | Change Time | Created By | Create Date | Create Time | Process | Last Step | Version | eDocument Status Overview | Posting Date | Interf Type | Approval |
|---|---|---|---|---|---|---|---|---|---|---|---|---|---|---|---|---|---|---|---|---|
| Entry 1 | | | | | | | | | | | | | | | | | | | | |
| Entry 2 | | | | | | | | | | | | | | | | | | | | |
| Entry 4 | | | | | | | | | | | | | | | | | | | | |
| ... | | | | | | | | | | | | | | | | | | | | |

History User Interface — [Search]

| eDocument GUID | Sequence No. | Country Code | Country | Source Type | eDocument Source Key | eDoc Type | eDoc Status | Changed By | Changed On | Changed Time | eDoc. Process Overview | Status | Reason | File GUID | File Name |
|---|---|---|---|---|---|---|---|---|---|---|---|---|---|---|---|
| Entry 1 | | | | | | | | | | | | | | | |
| Entry 2 | | | | | | | | | | | | | | | |
| Entry 4 | | | | | | | | | | | | | | | |
| ... | | | | | | | | | | | | | | | |

FIGURE 6C

METHOD AND SYSTEM FOR AN ELECTRONIC DOCUMENT FRAMEWORK

RELATED APPLICATIONS

This application claims priority to India Patent Application No. 4072/CHE/2015 filed on Aug. 5, 2015, the content of which is incorporated herein in its entirety.

FIELD OF THE DISCLOSURE

The present invention relates to a method and system for generating, sending, updating, and monitoring electronic documents (eDocuments). More specifically, the present invention relates to generating, sending, updating, and monitoring eDocuments based on source documents created in Enterprise Resource Planning (ERP) software.

INFORMATION

Every country and process has different technical requirements for the transmission of eDocuments. These technical requirements can greatly vary. Business-to-Government (B2G) and Business-to-Business (B2B) communication is a worldwide trend that expands quickly every year. Companies in countries, e.g., Brazil and Mexico, may be required by country law to send electronic invoices (i.e., eDocuments) to the government for approval for transactions that are, e.g., posted in their ERP software. The number of individual countries having regulations, which require different technical requirements, has increased in recent years. In another example scenario, the government is not an active party in the communication. There, e.g., eDocuments may be used to automate business flows. These technical requirements could be, e.g., format requirements, authentication requirements, legal requirements, etc.

To illustrate, a business entity in a particular country may create an invoice (i.e., an eDocument) when doing business with another entity, which may be another business entity or the local government. When creating this invoice, the business entity is required, by government regulation, to conform the invoice to specific technical requirements. These technical requirements compel the supplier to carefully manage and monitor all of its eDocuments for compliance. This monitoring and managing forces the supplier to expend significant amounts of resources, since these regulations can be complicated, vary greatly between individual countries, and are usually specific to a single type of eDocument.

Once the business entity has ensured that its eDocument complies with the technical requirements and government regulations, the business entity submits the eDocument to a common authority (i.e., government agency), so that the eDocument can be reviewed for compliance. Only after the common authority confirms that the eDocument is compliant, is the business entity authorized to transmit the eDocument to the other entity.

The process of creating and exchanging everyday business documents becomes a highly technical and time-consuming process, which requires different, individualized solutions for each individual country and each type of eDocument being exchanged. The process can involve significant expenditures of resources to ensure that exchanged eDocuments are legally compliant with the relevant technical regulations.

Traditional methods attempting to solve these issues only a particular country and a particular eDocument type. The existing systems still require significant amounts of resources to complete, and once the systems are produced, they have very little synergy and are not easily scalable or transferrable due to the wide variety of government regulations and eDocument types. This inefficient use of resources is joined by a large lack of quality and integration issues. The customers that do business in different countries must execute varying different solutions to tackle and solve a similar situation.

This issue becomes particularly relevant in regard to large, multinational corporations, which operate in many different countries, and therefore, are required to comply with a wide range of different technical requirements.

BRIEF DESCRIPTION OF THE DRAWINGS

FIG. 6A is an exemplary user interface according to an embodiment.

FIG. 6B is an exemplary user interface according to an embodiment.

FIG. 6C is another exemplary user interface according to an embodiment.

DETAILED DESCRIPTION

Figure 1A:
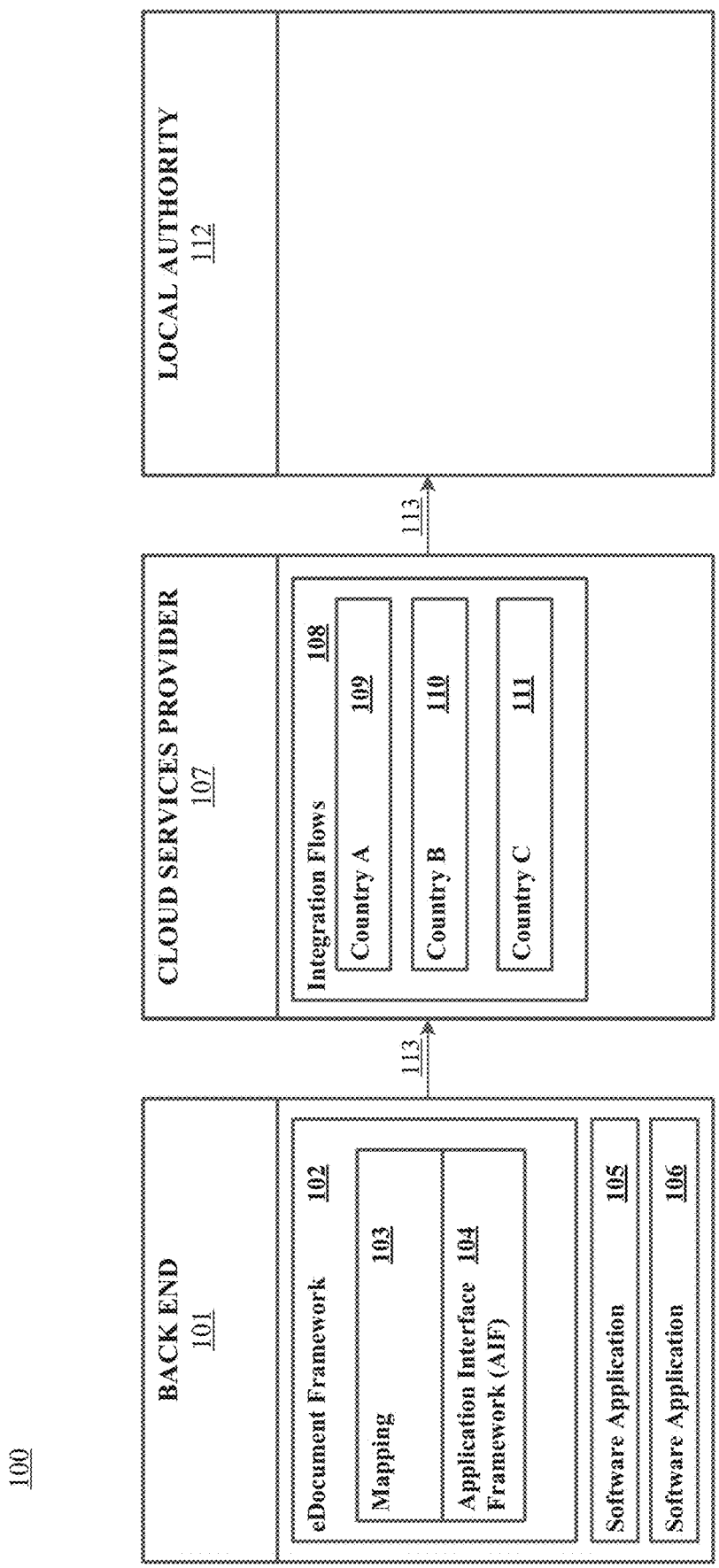
FIG. 1A is a simplified view of the solution landscape.

In an embodiment of the present invention, the eDocument framework system provides a set of tools to allow the incorporation of country-specific solutions without the need to start from scratch every time. The eDocument framework system is prepared and/or configured to manage, generate, send, update, and monitor the eDocuments. The eDocuments can be sent to local authorities, business partners, or other recipients. Functionality is provided by the eDocument framework system, which allows the framework system to be easily expandable to include additional details and particularities for a specific country and process. This expansion can be accomplished without expending significant amounts of additional resources and effort to keep uniformity. The eDocument framework system also reduces maintenance costs.

To accomplish this, in an embodiment of the present invention, the eDocument framework system includes of a number of functions described below that enable the eDocument framework system to highly automate the process of managing, generating, sending, updating, and monitoring eDocuments.

In an embodiment, the data collection part is part of the application, and it must be able to retrieve the required technical requirements for the desired eDocument, map it to an appropriate communication format, and send it out through a web service during a certain step of a process (for example in the sales division (SD) of ERP, during post goods issue).

In an embodiment, the data collection is implemented in all applications that generate eDocuments. One example is through the backend of ERP software. For electronic invoicing that can be in the following in the ERP software: Sales and Distribution (SD) Financials (FI); Financial Cost Accounting (FI-CA); Real Estate (RE-FX); and where industry specific invoicing is done. Further aspects or modules of the ERP software can include; Sales and Distribution of Delivery Goods Issue (SD Del GI); Sales and Distribution of Transportation Planning (SD Transportation Planning); Sales and Distribution Bills (SD Bill); Sales and Distribution of Logistics and Material Management (MM); and Industry Specific Utilities (IS-U). In an embodiment, the eDocument itself includes the source data when electronic documents have to be created without a standard document. Examples of this are incoming documents.

In an embodiment, the actual communication is performed outside of the eDocument framework system. The eDocument framework system is built to communicate and interact with a cloud services provider, for example, SAP Hana Cloud Integration (HCI). It is possible to use other communication platforms, which would be a customer specific solution. In an embodiment, the communication platform is decoupled from the eDocument framework system so that any application is able to use the HCI communication flow being offered for a certain use case and/or country. In an embodiment, the communication platform is a cloud application, making it independent of installed bases and allowing faster deployment and maintenance. Incoming electronic documents may be generated outside of the ERP software. In an embodiment, the eDocument is sent to an email account or to an HCI tenant of the customer.

In an embodiment, the framework system initiates a pull mechanism to retrieve these objects, store them as part of existing eDocuments or create new eDocuments, depending on the content of the information received.

In an embodiment, the eDocument framework system sends different messages regarding current eDocument status and different events affecting eDocument (e.g., user actions in an interface). For example, response of such messages (approval, response, status response, etc.) is be received and processed. To accomplish this, for example, different interfaces are monitored in the eDocument framework system. In an embodiment, versioning of the interfaces can be effected in order to allow interface format change with time. In an embodiment, the eDocument framework system stores relevant changes to the eDocument in a database.

FIG. 1A is a simplified view of the system landscape. The system landscape 100 includes a backend 101, a cloud services provider 107, and a local authority 112. In an embodiment, the backend 101 is ERP software. The backend 101 can also include eDocument framework system 102. The eDocument framework system 102 includes a mapping application 103 and an application interface framework (AIF) 104. The back end 101 ERP system can also include additional software applications 105 and 106, where the source documents of the eDocument Framework system 102 can be generated. Additional applications can include SAP APPL 6.00 or SAP Netweaver.

According to one embodiment, mapping application 103 is fully included within the backend 101, and all processes related to mapping data are performed in the backend 101. This allows for all relevant information to be presented in the backend 101, which does not require the cloud service provider 107 to retrieve information from the backend 101 for processing. Locating the mapping application within the backend 101 also creates several advantages, for example: prevention of redundant data from being transmitted; easier mapping and analysis of the generic structure; customer extensions do not have to be added in the cloud services provider; easier testing and troubleshooting; no requirement for customer proficiency in Advanced Business Application Programming (ABAP) or cloud service provider; reduced testing effort since the information only needs to be mapped once from the source structure to the country/eDocument type specific format; and business monitoring is concentrated in the back end 101.

Application interface framework (AIF) 104 can be included in the eDocument framework system. AIF 104 defines and manages outbound and inbound message processing. Although AIF 104 handles a number of formats, a web service definition language (WSDL) can be used in connection with the cloud services provider 107. In a number of cases, the final destination does not handle web services. In those cases, emails have to be sent with extensible markup language (XML) content. The version of the message used in the AIF 104 is determined in the eDocument framework system 102 and not in the AIF 104. The functionality of AIF 104 is more fully described below.

Cloud services provider 107 can be SAP HCI, for example, and can include integration flows 108. Integration flows 108 are a Business Process Model Notation (BPMN) based model that can be executable on the cloud services provider. Integration flows 108 can include technical requirements related to individual Country A 109, Country B 110, and Country C 111, etc. Integration flows 108 provide communication between the cloud services provider 107 and the local authorities 112, which can be implemented through Webservices 113. Integration flows 108 also provide validation, approval, certificates, registration of created eDocuments, and digital signatures for transmission of eDocuments.

Figure 1B:
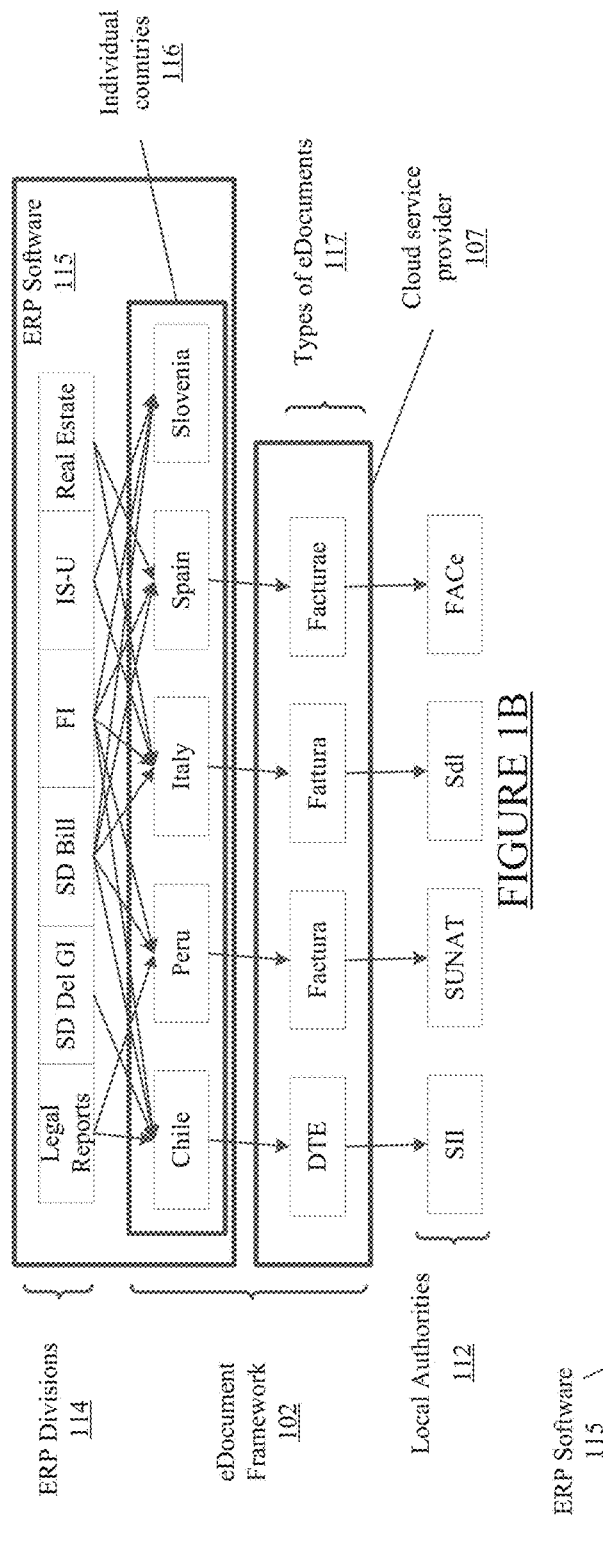
FIG. 1B is a solution architecture according to an embodiment.
Figure 1C:
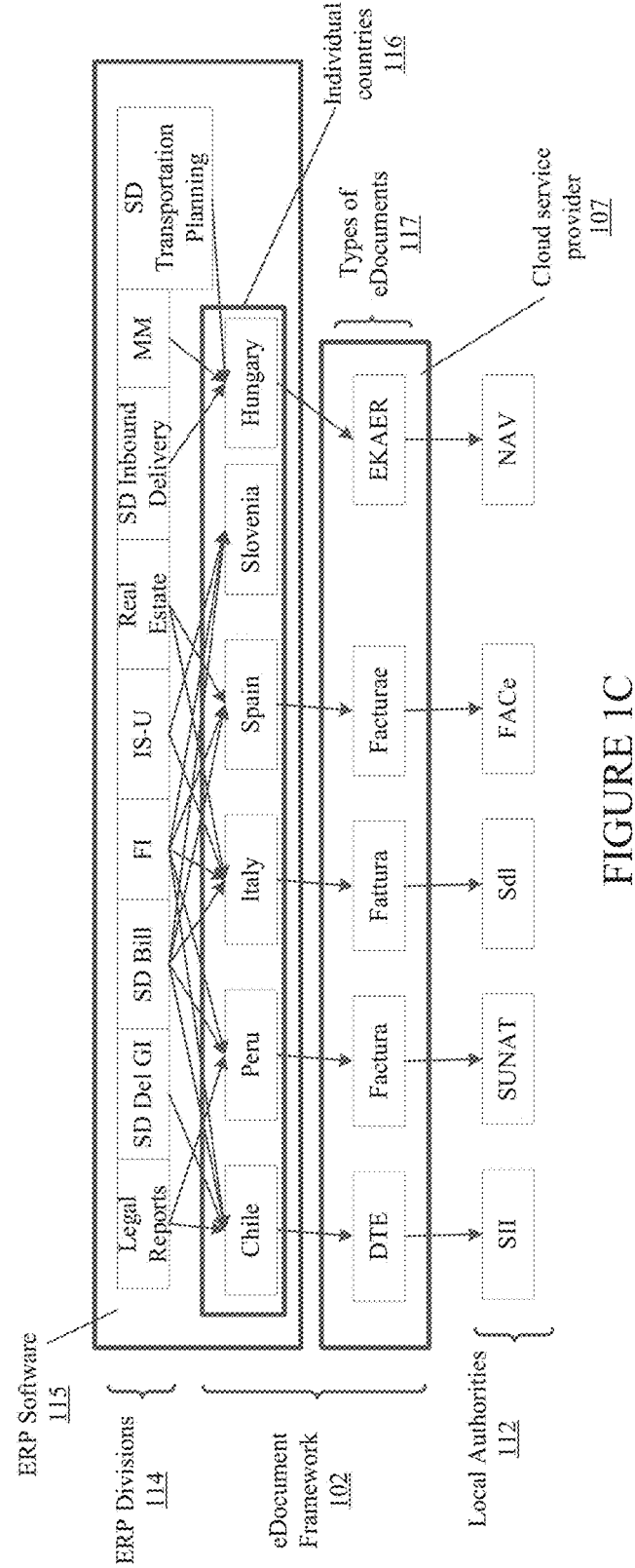
FIG. 1C is a solution architecture according to an embodiment.

FIG. 1B and FIG. 1C illustrate system architecture according to particular embodiments. FIG. 1A illustrates separate ERP divisions 114 (i.e., Legal Reports, SD Del GI, etc.) within the ERP software 115 can communicate division specific data to the eDocument framework system 102. This information can then be processed using the country specific settings in the eDocument framework system 102 and submitted to a cloud services provider 107. Subsequently, the cloud services provider can transmit the different types of processed eDocuments 117 to their respective local authorities 112. FIG. 1B and FIG. 1C also illustrate the scalability of the eDocument framework system 102 with regard to adding new ERP divisions, new countries, and/or new types of eDocuments.

Figure 2A:
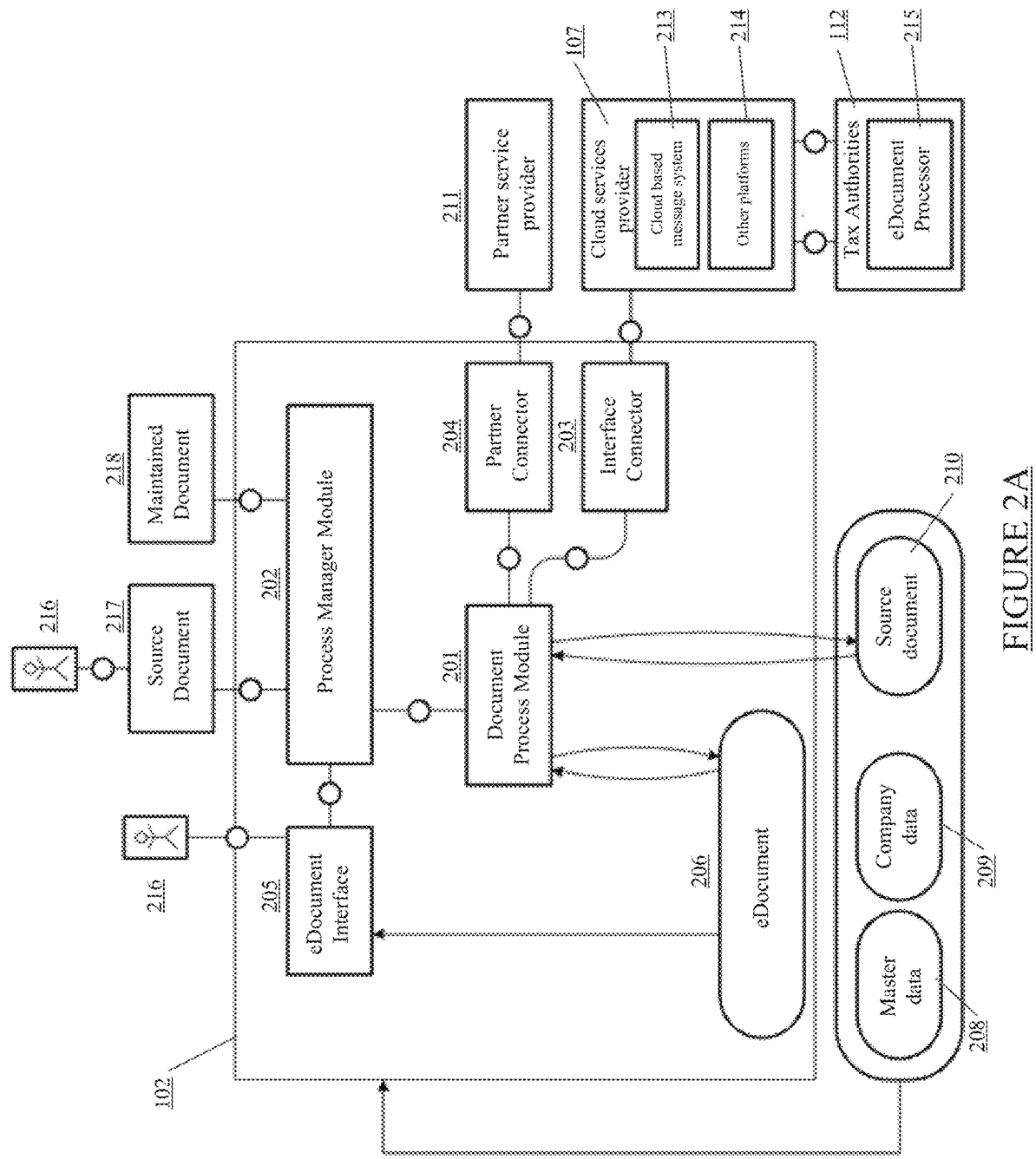
FIG. 2A is a simplified block diagram of the system according to an embodiment.

FIG. 2A is a simplified block diagram of the eDocument framework system 102 according to an embodiment. eDocument framework system 102 can include document process module 201, process manager module 202, interface connector 203, partner connector 204, eDocument interface 205, and eDocument 206. FIG. 2A also illustrates how eDocument framework system 102 can interact with other components within the solution landscape: users 216, source document 217, maintained document 218, partner service provider 211, and cloud services provider 107. In one particular embodiment, a user 216 can interface with user interface 205 located within the eDocument framework system to perform certain tasks such as monitoring and viewing the history of the eDocument 206. Additionally, user 216 can create a source document 217, which can be transmitted to and received by the process manager module 202. Alternatively, process manager module 202 can receive a maintained document 218.

eDocument framework system 102 can also be configured to communicate with partner service provider 211 via partner connector 204. The partner connector 204 can be used for any type of communication with a partner service provider, be it customer, vendor or business partner. Possibilities are for example: printing, generation of pdf files, XMLs, and emails with attachments. This is meant for interchanging with all partner service providers except for tax authorities. There is no limitation on the interface technology here.

In one particular embodiment, eDocument framework system 102 communicates with cloud services provider 107 via interface connector 203. Interface connector 203 prepares the eDocument for transmission and creates the message structure and the mapping of the source document to the message structure. This can be done in AIF 104 or in a Custom Business Add Ins (BAdI). The number of ways to communicate using this BAdI is limited to Custom and Advanced Business Application Programming (ABAP) Proxies or XML via the AIF 104. The choice of the interface connector 203 has three dimensions. First, the specific interface technology. This choice can be made per Company and eDocument type. AIF 104 content can be communicated in the following ways: as Webservices or providing an XML for subsequent processing. Alternatively, an AIF custom build can be used. Second, the choice of the interface itself. This choice depends on the source document structure, the process step/action, and the content (i.e., the actual source document). The AIF 104 is capable of choosing the correct version for the interface on the basis of the provided information. Third, the choice of the cloud services provider 107. This choice can be made per Company and eDocument type. Possible alternatives can include, for example, service orientated architecture (SOA) manager port, or a request for comment (RFC) destination. Cloud services provider 107 can include a cloud based message system 213. Cloud based message communication platform 212 can be, for example, SAP HCI. Cloud service provider 107 can also include other platforms 214.

FIG. 2A also illustrates interaction between cloud services provider 107 and local authority 112. Local authority 112 can be configured to exchange eDocuments with cloud services provider 107 via an eDocument processor 215.

As further illustrated in FIG. 2A, eDocument framework system 102 also includes document process module 201. Document process module 201 is found within standard applications and is the starting point in transforming standard documents into an eDocument 206 with the correct, legally required format. Document process module 201 is where the eDocument 206 is created on the base of source documents 210, which were created in standard ERP Alternatively the document process module 201 can include functionality wherein an eDocument 206 is created on information that will be included in the eDocument 206 itself. The start of the document process module 201 is a hook in a standard application or the start of automated processing of incoming eDocument 206. The original document process module 201 is more fully described below.

eDocument framework system 102 also includes process manager module 202. Process manager module 202 performs the following functions: determining possible subsequent steps on the base of the status of the eDocument; determining the new status for an eDocument on the basis of the execution of a process step; triggering the execution of the process step; translating the user interface or program action in a process step to be executed; and verifying authorization for a process step. The process manager module 202 can also be configured to communicate with source document 210, company data 209, and master data 208. The process manager module 202 functionality is more fully described below.

eDocument framework system 102 also includes eDocument interface 205. The eDocument interface allows for the monitoring and processing of eDocument 206. Each type of eDocument 206 will have its own set of process steps. All steps that can be relevant for manual processing are present in the eDocument interface 205. The eDocument interface 205 is more fully described below.

Figure 2B:
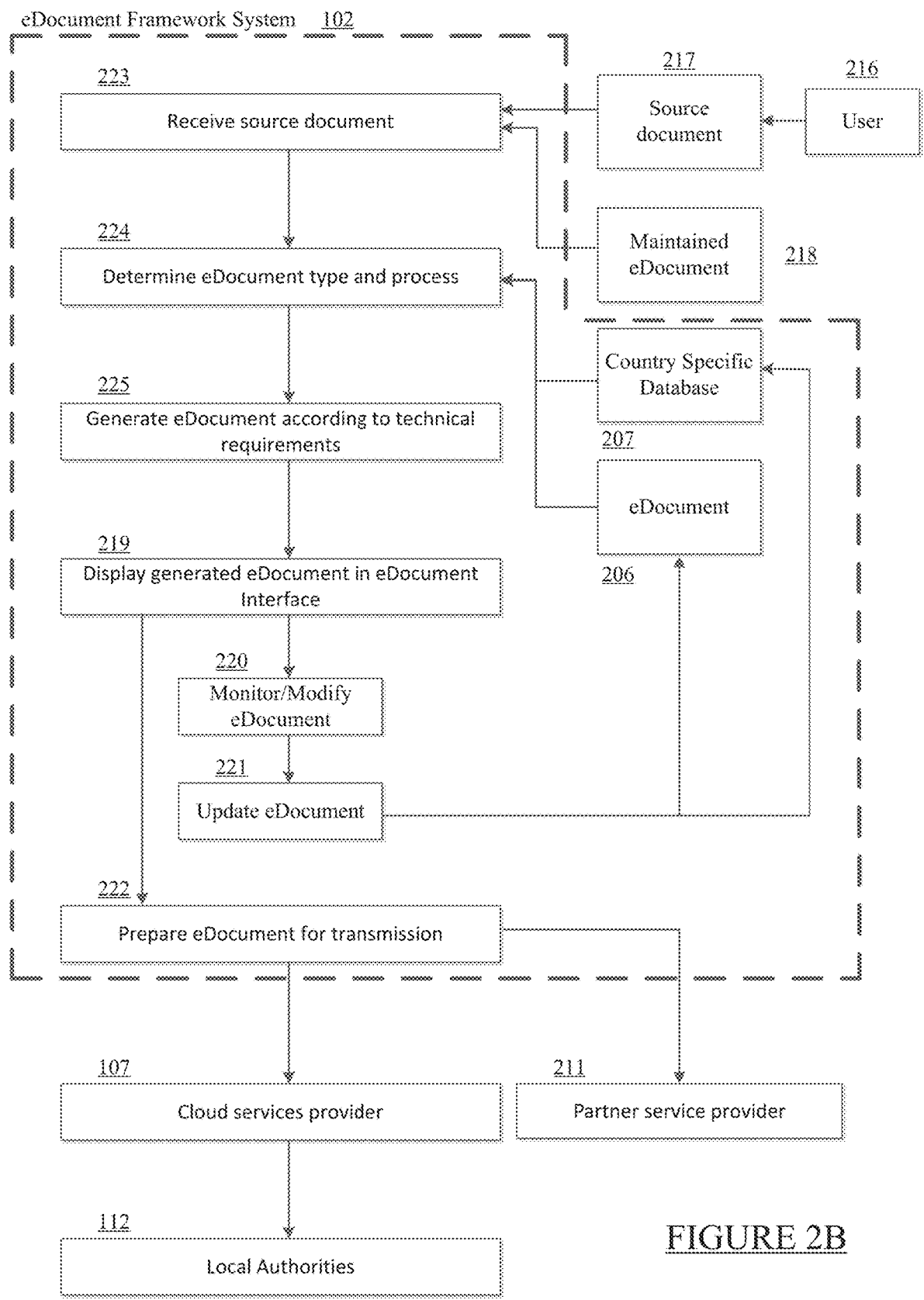
FIG. 2B is a flowchart of the framework according to a particular embodiment.

FIG. 2B is a simplified flow chart illustrating the basic functionality of the eDocument framework system 102. The eDocument framework system 102 can be initiated during process 223, when the system receives a document from either a user created document (i.e., source document 217) or a maintained eDocument 218. Next, in process 224, the eDocument framework system determines the eDocument type and required process. In one particular embodiment, the eDocument framework system can use the cloud services provider 107 and/or the eDocument 206 itself in carrying out the mapping process.

Once the necessary technical requirements have been determined, process 225 generates an eDocument with the necessary technical requirements, and process 219 displays the eDocument to a user. Once displayed, process 220 allows the eDocument to be monitored and/or modified by the user. Process 221 updates the eDocument 206. Process 222 prepares the eDocument for transmission to either the cloud services provider 107 or a partner service provider 211. If transmitted to the cloud services provider 107, the cloud services provider can subsequently submit the eDocument to the local authorities 112.

Figure 3:
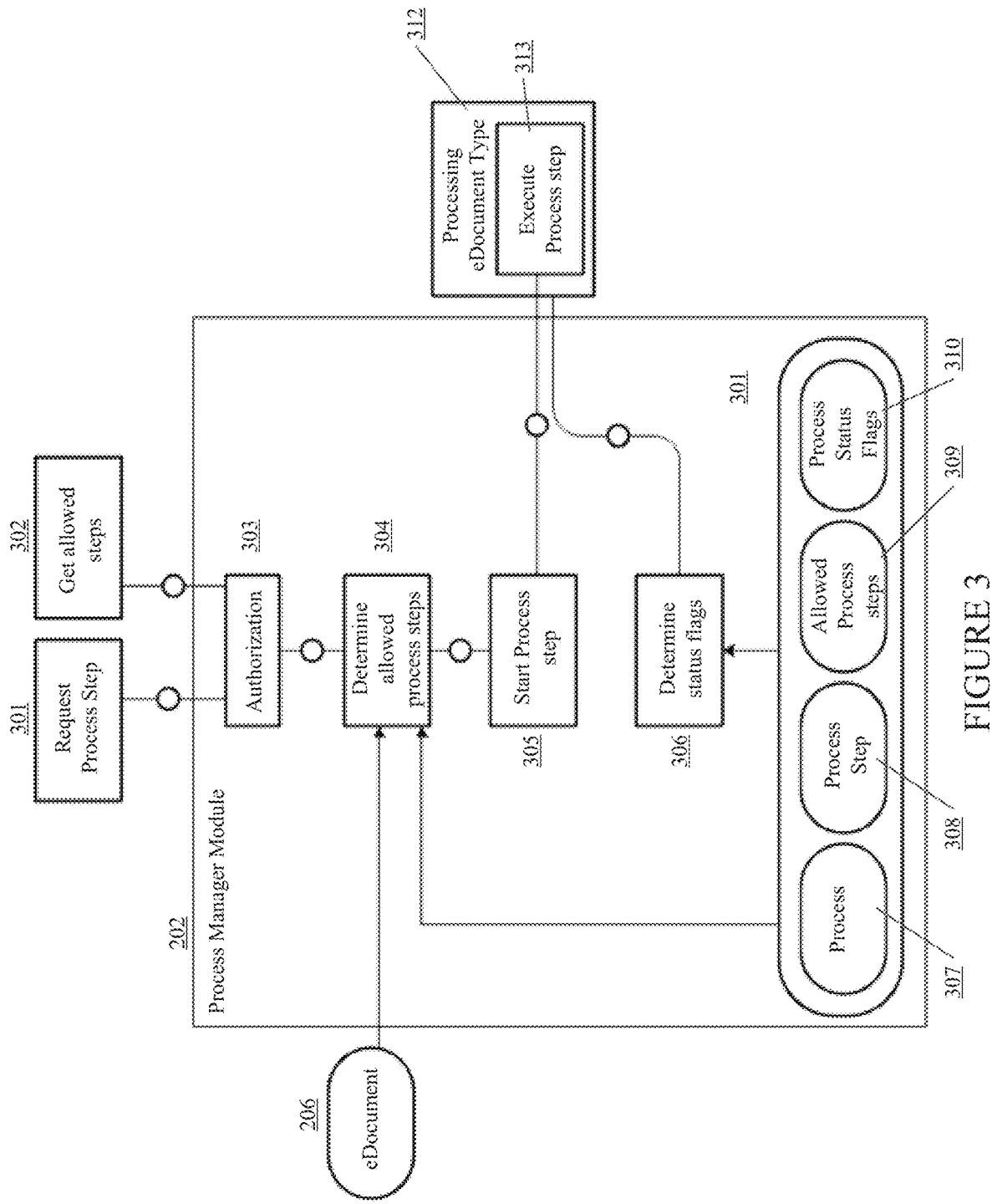
FIG. 3 is a simplified block diagram of the process manager according to an embodiment.

FIG. 3 is a simplified block diagram of the process manager module 202 according to an embodiment. Process manager module 202 determines the configuration of a specific eDocument 206 with respect to the process steps, statuses related to process steps, and actions resulting from these steps. In the process manager module 202, the configuration for a specific eDocument type with respect to the process steps, statuses related to process steps, and actions resulting from these steps can be found. A process consists of a number of process steps/actions. A process step action can be a function module or an interface, for example, create/modify the eDocument and create eDocument history. The entire handling of the eDocument 206 is done through the process manager module 202. The configuration of the processes and related process steps are Country and eDocument type specific. The process manager module 202 will invoke the processing in the local coding and does not make any changes. The process manager module 202 is also responsible to verify if the user is authorized to perform actions in the framework system.

Process manager module 202 operates as follows: a request for a process step 301 or get allowed step 302 is initiated, and the response is transmitted to the process manager module 202. Process 303 authorizes the requested process 301 or get allowed step 302, and determine allowed process step 304 then determines the allowed process steps based on eDocument 206, and can include, for example: process 307, process step 308, allowed process step 309, or process status flag 310. Start process step 305 initiates the requested and authorized process step. The selected process step is transmitted for execution to processing eDocument type 312. The process step is executed at execute process step 313, and the process manager subsequently determines status flags at process 306.

Figure 4:
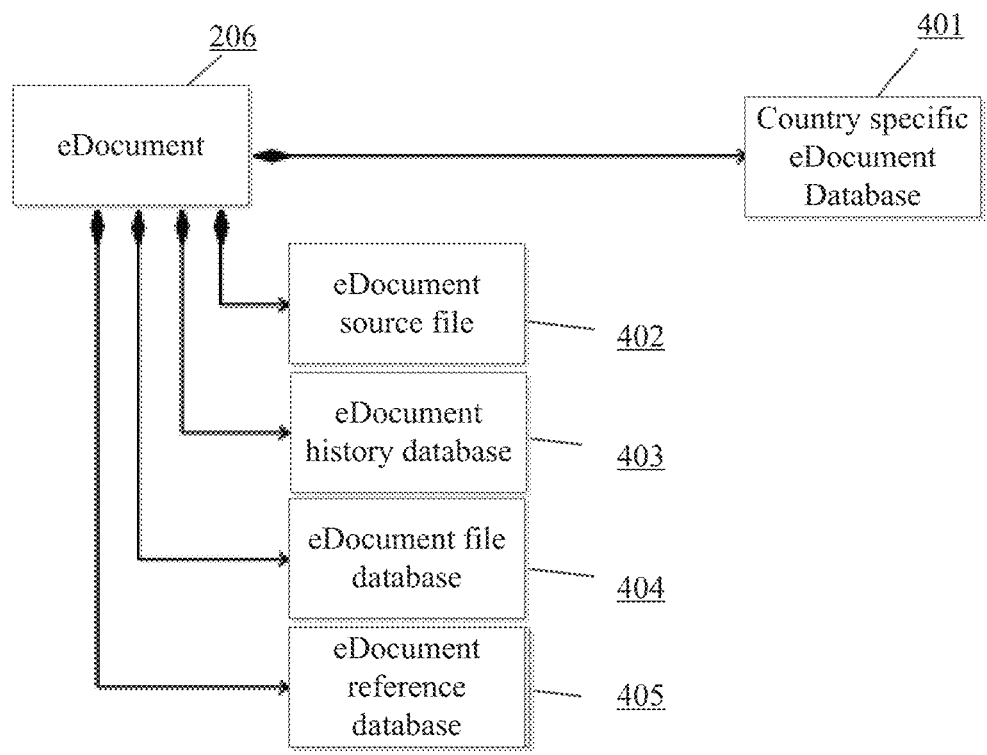
FIG. 4 is a simplified block diagram of the implementation of an eDocument according to an embodiment.

FIG. 4 is a simplified block diagram of the implementation of an eDocument according to an embodiment. The eDocument 206 can include the status and process handling fields, as well as document type, organizational data, and the identity of the logical system. Each country will have one or more eDocument types. These consist of a header that is shared across all eDocument types and one or more country specific structure(s). Naming of the specific structure will be in accordance with the names used in the country. The source document for the eDocument can differ. It is possible that eDocument types and process are shared by documents from various sources. For example an e-invoice can be generated in SD, FI and industry solutions. Field names are assigned dynamically in the cockpit. It is therefore important that the names of the fields are unique within all eDocument databases 401-405. Each eDocument 206 can include the following: country specific eDocument database 401; eDocument source file 402; eDocument history database 403; eDocument file database 404; and eDocument reference database 405.

Country specific eDocument database 401 holds the relevant data for the country format. For each eDocument 206, one country specific database 401 is present. If large structural differences exist for document types used in the country, then more than one country specific eDocument database 401 can exist. It is also possible that a country implementation requires a set of country specific eDocument databases 401 such as header, items and tax tables. It is also possible that no country specific content is present.

eDocument source file 402 can include the file that holds the source information for eDocument 206.

eDocument history database 403 can be a copy of the eDocument 206, and can include the content of the generic table at a point in time. The execution of a process step can add an entry in this table. eDocument history database 403 can include the process log of the eDocument 206 as well. Relevant changes to the eDocument 206 will be recorded here. This is achieved by making a copy of eDocument 206, storing it in the eDocument history database 403, every time that a relevant change is made to the eDocument 206.

eDocument file database 404 can include the files, such as XML's and mails that are relevant for the eDocument 206 and have been used in communication. Several files can be added within a process step. The type of file is classified by a file type (must not be confused by format type). eDocument 206 can include a forward reference to the eDocument file database 404. This functions when one file is created in a step. It is however possible that several files are attached during a step. For that case a backward reference to the eDocument 206 and/or eDocument history database 403 is present in the eDocument file database 404. A file type is present to supply an easily understandable semantic meaning of a file, and the possible file types are defined per country in configuration tables of the eDocument framework system 102.

eDocument reference database 405 can be used to include a list of documents that are relevant for the eDocument 206. An example is the daily report for a specific type of invoices. The identifications of all relevant documents are kept in this file. This table will include references to other, related documents. A Reference Type defines the type of document (e.g., eDocument 206 or source document 217) that is referred to. A sequence number that is independent on the number in the eDocument 206 will be part of the key.

Figure 5:
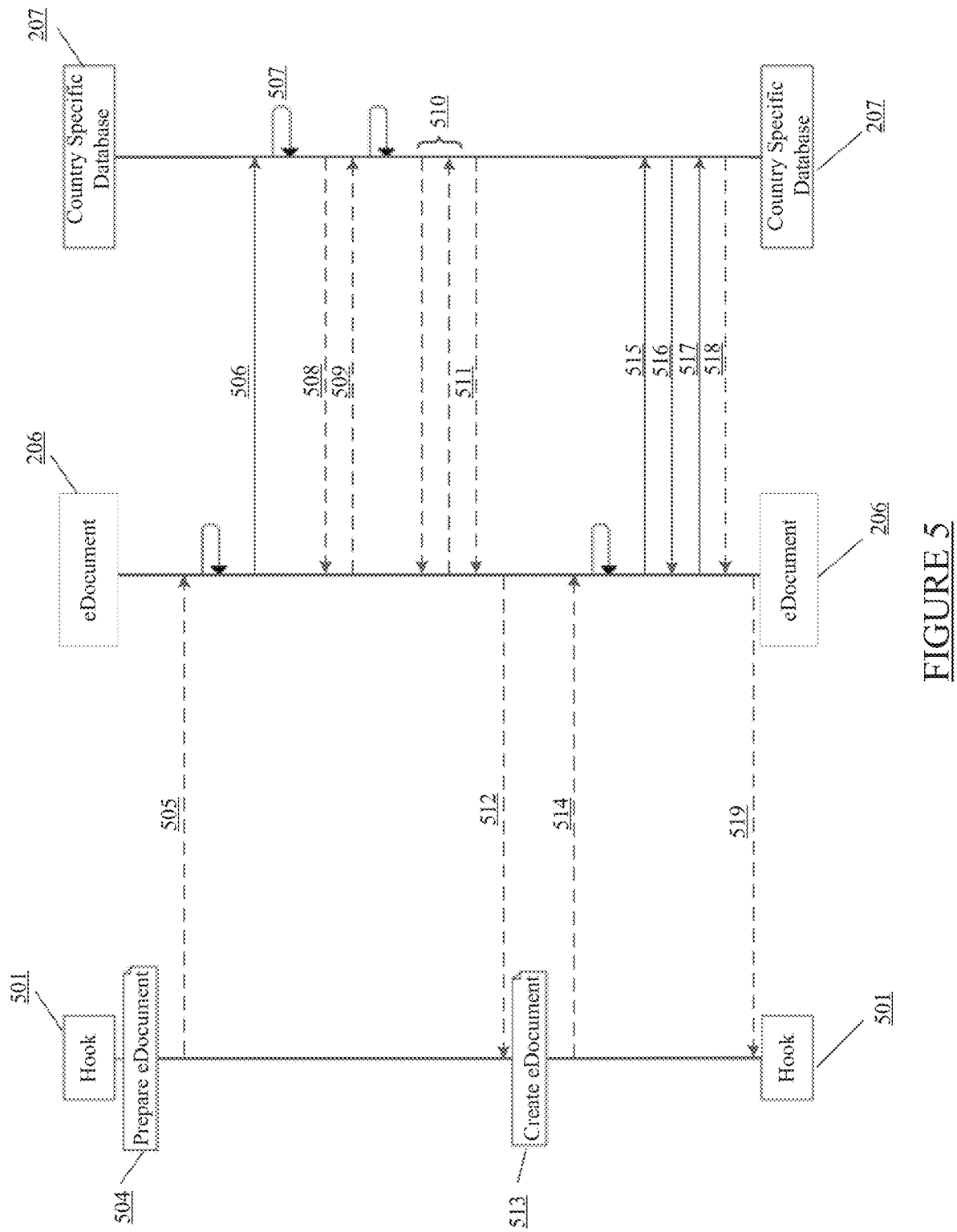
FIG. 5 is a simplified diagram of the document process according to an embodiment.

FIG. 5 is a simplified sequence diagram of the document process module 201 according to an embodiment. The document process can be carried out in the following steps:

First, the document process is initiated at hook 501. Next, the eDocument is prepared at 504. Next, message 505 determines if the eDocument 206 needs to be generated for the company/source document combination. Message 506 calls a constructor on the basis of the country and corresponding eDocument subclass. Message 507 calls the corresponding subclass from the country specific database 207, and message 508 sends the corresponding subclass and eDocument type to the eDocument. Message 509 indicates the transfer of the eDocument type from the eDocument 206 to the country specific database 207 when the eDocument type has been entered manually by the user.

Messages 510 indicates that additional filtering can be performed on the basis of document type and other information. Additional filtering can include, for example, a customer BAdI, which can be available to provide additional filtering and to change the standard eDocument type determination.

Next, if the eDocument 206 is to be generated, message 511 returns an eDocument instance from the country specific database 503 to the eDocument 206. Message 512 returns the eDocument instance from the eDocument 206 to the hook 501. An eDocument is then generated at 513.

After generation of the eDocument, message 514 returns an eDocument instance from the hook to the eDocument 206. Message 515 sends the country specific additional eDocument data to the country specific database 207. Message 517 indicates that the country specific additional eDocument is saved to the country specific database 207.

The eDocument instance 206 and the country specific instance are stored if both messages 518 and 519 return success.

FIG. 6A is an exemplary user interface. The eDocument framework system 102 can have a user interface 600 to display the documents, their status, and their processing history. User interface 600 can include a window for selection of parameters 601, a window for selecting eDocument types 602, selection of eDocument billing documents 603, eDocuments accounting documents 604, eDocuments delivery documents 605, and other options for eDocuments 606.

Through this interface, a user to able to monitor and/or modified a specific eDocument. The user interface will allow appropriate actions to be taken when an eDocument cannot be processed automatically. The buttons displayed depend on the country of the selected company code in the window for selection of parameters 601. For the eDocuments, it is possible to view the source documents by type in the window for selecting eDocument types 602, and/or by creation date (interval) 609. Source documents that should have had an eDocument created can be selected through the window 606.

FIG. 6B is an exemplary eDocument user interface 607. eDocument user interface 607 includes the details of the eDocument. It allows access to the source documents and also can include an AIF user interface for monitoring at message level. Monitoring at message level allows for viewing of the originating document and the resulting document.

FIG. 6C is view of an exemplary history user interface 608, which allows viewing of the eDocument history database 403. The history user interface 608 displays the eDocument history 609. Additionally, for the eDocuments, it is possible to download the files generated or retrieved in the AIF user interface, eDocument user interface, and/or the history user interface 608 that have been sent or received during the different process steps.

eDocument user interface 607 and history user interface 608 can display the following information: eDocument GUID; status, country code, country, source type, eDocument source key, eDoc. Type; eDoc. status; log system, changed on, change time, created by, create date, create time, process, last step, version, eDocument status overview, posting date, interfType, and approval. Other details can be provided as well. Additionally, from the eDocument user interface 607, a user can have access to certain commands. These commands can include, for example: refresh, create, submit, Tax Authorities, customer, export file, history, and status.

Figure 7:
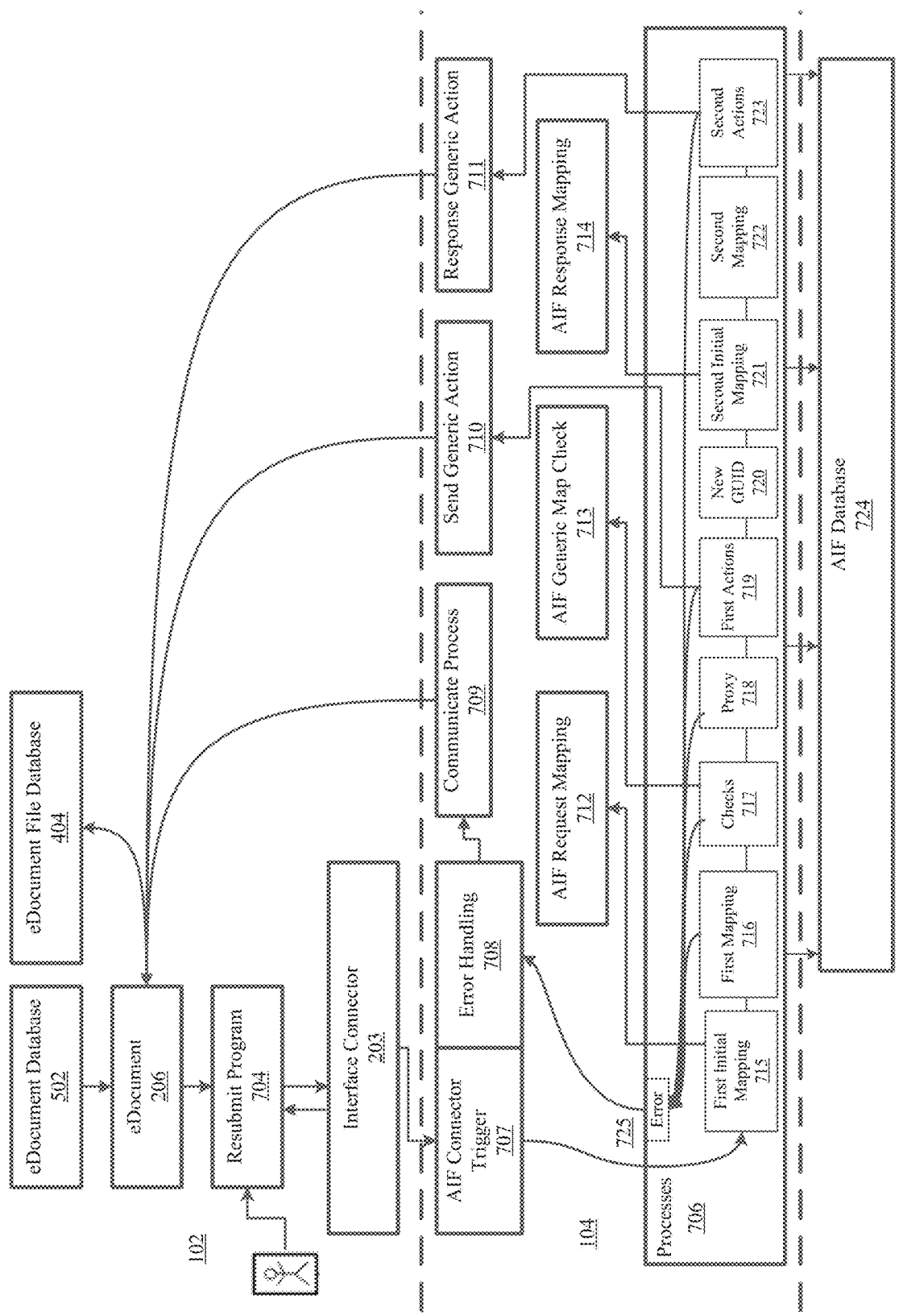
FIG. 7 is a simplified block diagram of the interaction between the system and the application interface framework according to an embodiment.

FIG. 7 is a simplified block diagram of the interactions between the system and the application interface framework. A user 702 interacts with the eDocument framework system 102, to initiate the resubmit program 704, which receives the specified eDocument 206 from the eDocument database 502. Resubmit program 704 submits the eDocument 206 to the interface connector 203. The interface connector 203 interacts with AIF 104, and is configured to send the eDocument 206 to AIF 104.

AIF 104 receives the eDocument via AIF connect trigger 707. AIF connect trigger 707 processes the eDocument 206 via several processes 706: first initial mapping 715, first mapping 716, checks 717, proxy 718, first actions 719, new globally unique identifier (GUID) 720, second initial mapping 721, second mapping 722, and second actions 723. These processes interact with the AIF database 724. Additionally, if an error occurs during the processes 706, the error is transmitted to an error collector 725, which is then transmitted to error handling 708 process of the AIF 104. The error is subsequently communicated back via communicate process 709 to the eDocument framework system for further processing. Additionally, first initial mapping 715 can transmit a result to AIF request mapping 712, checks 717 can transmit a result to AIF generic map check 713, and second initial mapping can transmit a result to AIF response mapping 714.

During the processes 706, upon completion of the first initial mapping 715, an AIF request mapping is generated. Upon completion of the checks 717, an AIF generic map check is generated, and once the first actions 719 process is completed, a send generic action 710 is generated and transmitted to the eDocument framework system. After the second initial mapping, an AIF response mapping 714 is generated, and after the second actions 723 process is completed, a response generic action 711 is generated. The response generic action 711 is also transmitted back to the eDocument framework system 102.

Figure 8:
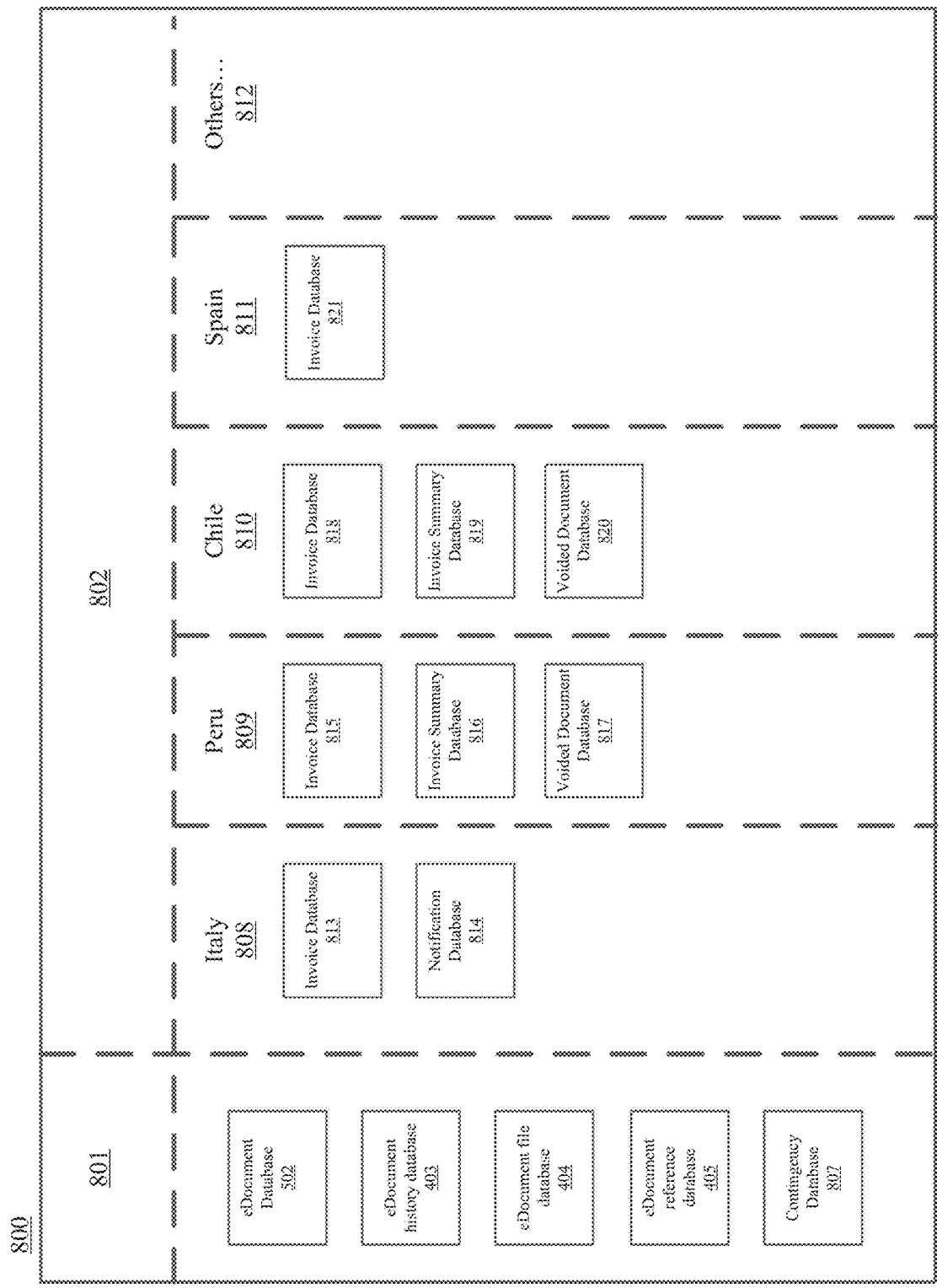
FIG. 8 is a simplified diagram of a database for use in an embodiment.

FIG. 8 is a simplified diagram of an exemplary database for use by the eDocument framework system 102. Database 800 is a listing of the country specific additional data arranged by country. Database 800 can include global database 801 and country specific database 802. Global database 801 can include the following databases: eDocument database 502; eDocument history database 403; eDocument file database 404; eDocument reference database 405; and contingency database 807.

Country specific database 802 can be divided into particular country databases. For example: Italy database 808; Peru database 809; Chile database 810; Spain database; and others 811. Each particular country database 808 to 811 can further include individualized databases, which can relate to specific technical requirements for the respective countries and eDocument type. For example, the Italy database 808 can include an invoice database 813, which includes all relevant technical requirements for invoices in Italy. Also, the Italy database 808 can include a notification database 814, which includes all relevant technical requirements for legally compliant notifications in Italy. The Peru database can include its own specific invoice database 815, invoice summary database 816, and a voided document database 817. Likewise, Chile can also include its own invoice database 818, invoice summary 819, and voided document databases 820. Spain can include its own invoice database 821 as well. As can be understood by the exemplar structure of the database 800, the eDocument framework system is easily scalable.

Figure 9:
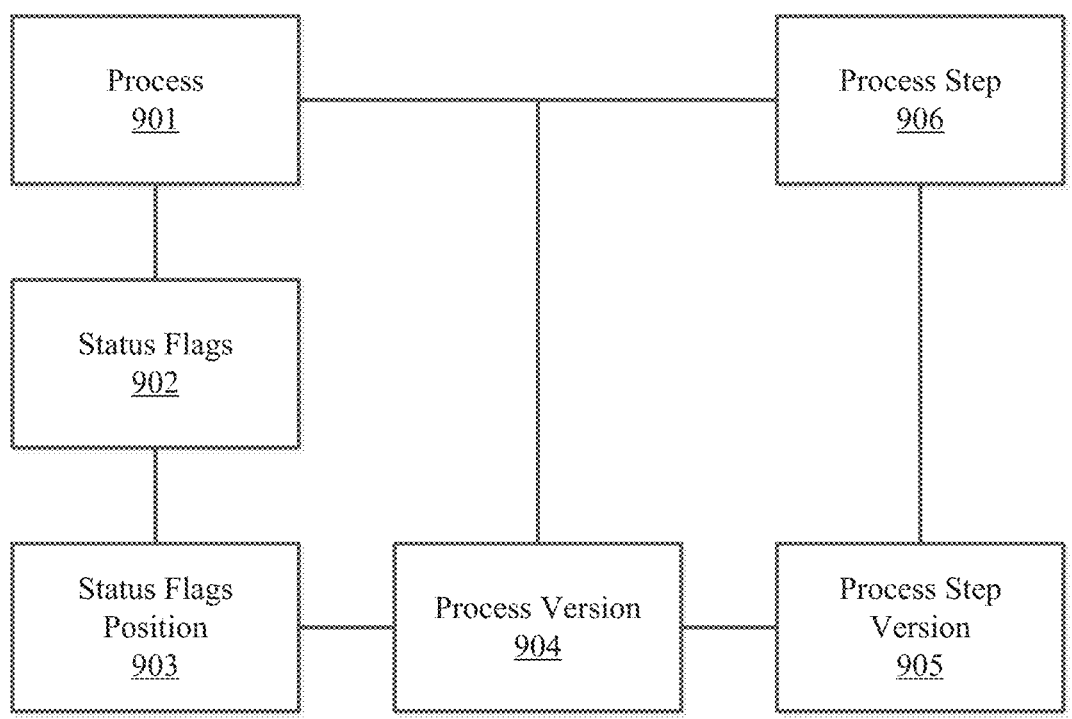
FIG. 9 is a simplified diagram of an eDocument in an embodiment.

FIG. 9 is a simplified diagram of an eDocument assigned process. Each eDocument 206 will have a process assigned. This defines the business process. When the eDocument is created together with the process 901, a process version 904 is determined. The process 901 will have an assigned list of valid process steps 906 and a list of valid status flags 902. Process 901 will also have assigned one or more process versions 904. One particular process version 904 will have assigned a list of process steps 906 that are valid for that process version 904, and an ordered list of status flags 902 that can be set in that process version 904. The existence of process versions 904 allows changing the behavior (i.e., the valid steps, and the valid status flags) of a process along time.

The process 901 will consist of one or more process steps 906. A process step 906 represents an action in the eDocument framework system. The action can, for example, be the triggering of an interface, printing or cancelling of an eDocument. The last process step 906 is included in the eDocument 206. Each eDocument 206 type can have a configurable set of processing steps 906. Although the eDocument type is country specific, the country will not be part of the key. The eDocument type is thought to be globally unique. The method and the class for the method that will execute the step are defined as part of the table.

On the base of the status of the eDocument 206 type, certain subsequent process steps 906 are allowed for the different types. The allowed steps are determined by verifying the status indicators that are relevant for each step. If these are set, then the step is allowed. The process steps will result in another state of the eDocument. This other state will be reflected in Status flags 902. The process status flag position 903 assigns the flag to a specific position in the status field in the eDocument database 502. A process status flag 902 can be assigned once per version. The process step version 905 can be the object used during runtime. The process step version 905 is the valid steps for the version.

Figure 10:
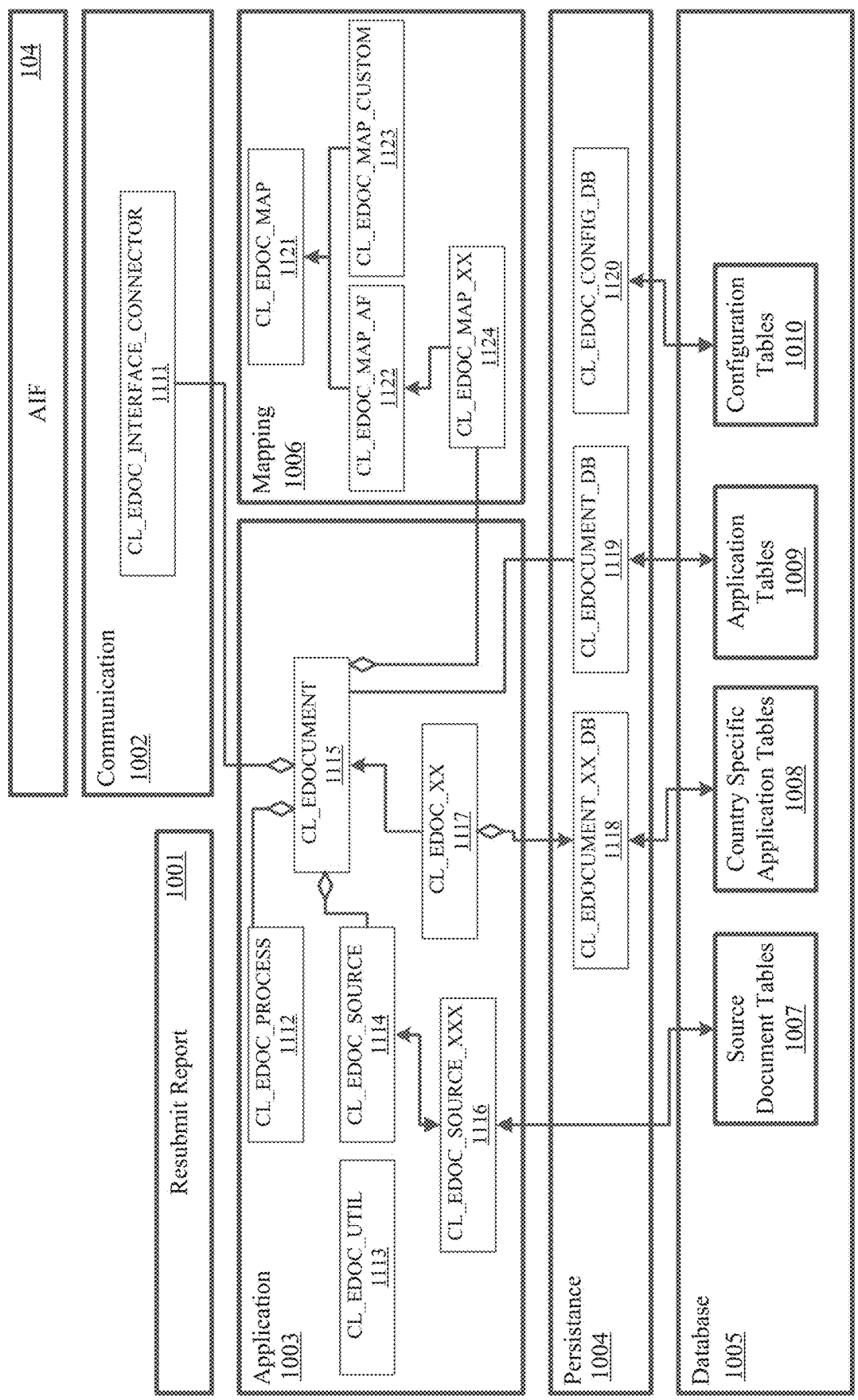
FIG. 10 is a simplified diagram of processing classes in an embodiment.

FIG. 10 is a simplified diagram of an exemplary method of processing classes. FIG. 10 illustrates the interaction of AIF 104, Resubmit report 1001, communication 1002, application 1003, persistence 1004, database 1005, and mapping 106. Communication 1002, application 1003, persistence 1004, and mapping 1006 can include specific technical objects that allow interaction.

Communication 1002 can include class CL_EDOC_INTERFACE_CONNECTOR 1111, which encapsulates interface connector logic. eDocument framework system 102 can instantiate this class and call different methods when the interface connector is required.

Application 1003 can include the following classes: CL_EDOC_PROCESS 1112; CL_EDOC_UTIL 1113, which includes eDocument utilities; CL_EDOC_SOURCE 1114, which includes eDocument source data; CL_EDOCUMENT 1115, which includes eDocument class information; CL_EDOC_SOURCE_XXX 1116; and CL_EDOCUMENT_XX 1117 (XX stands for country specific class).

Mapping 1006 can include the following classes: CL_EDOC_MAP 1121, which includes eDocument mapping information; CL_EDOC_MAP_AIF 1122, which includes eDocument Mapping and encapsulates AIF mapping; CL_EDOC_MAP_CUSTOM 1123, which provides common interface to retrieve fix values maintained in AIF 104 or retrieve by a BAdI; and CL_EDOC_MAP_XX 1124 (XX stands for country specific class).

Persistence 1005 can include the following classes: CL_EDOCUMENT_XX_DB 1118; CL_EDOCUMENT_DB 1119; and CL_EDOCU_CONFIG_DB 1120.

Database 1005 can include the following: source documents tables 1007; country specific application tables 1008; application tables 1009; and configuration tables 1010.

FIG. 10 generally illustrates how each of the communication 1001, application 1002, persistence 1005, mapping 1006, and databases 1005 interact with each other in order to processes the respective classes. Additionally, FIG. 10 illustrates the interaction between the classes included within each of the communication 1001, application 1002, persistence 1005, mapping 1006, and database 1005.

Although the foregoing description includes several exemplary embodiments, it is understood that the words that have been used are words of description and illustration, rather than words of limitation. Changes can be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

As used in the appended claims, the term "computer-readable medium" can include a single medium or multiple media, such as a centralized or distributed database, and/or associated caches and servers that store one or more sets of instructions. The term shall also include any medium that is capable of storing, encoding or carrying a set of instructions for execution by a processor or that cause a computer system to perform any one or more of the embodiments disclosed herein.

The computer-readable medium can comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions can be stored.

The present specification describes components and functions that can be implemented in particular embodiments which can operate in accordance with one or more particular standards and protocols. However, the disclosure is not limited to such standards and protocols. Such standards periodically can be superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational. Accordingly, the disclosure and the figures are to be regarded as illustrative rather than restrictive.

In addition, in the foregoing Detailed Description, various features can be used together or without each other, or be grouped or described together the purpose of streamlining the disclosure. This disclosure is not to be interpreted as reflecting an intention that all such features are required to provide an operable embodiment, nor that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

Also, where certain claims recite methods, sequence of recitation of a particular method in a claim does not require that that sequence is essential to an operable claim. Rather, particular method elements or steps could be executed in different orders without departing from the scope or spirit of the disclosure.

What is claimed is:

1. A computer-implemented method to manage, generate, send, update, and monitor electronic documents (eDocuments), the method comprising:

receiving an eDocument from at least one of a source document and a maintained eDocument, the eDocument comprising header information;

associating the eDocument with one of a plurality of countries based on the header information containing one or more country specific structures;

mapping data to the received eDocument, wherein the data is based on at least one of the source document, the maintained eDocument, and at least one database, and includes a country specific technical format requirement for the associated country, the country specific technical format requirement defining types of data content required for the associated country, wherein the data content (i) is retrieved from one or more country specific databases that contain data relevant only to the associated country and (ii) does not include display of a country specific language;

responsive to the mapping, generating an eDocument based on the data mapped to the received eDocument according to the country specific technical format requirement;

displaying the generated eDocument to a user interface to allow monitoring and updating of the generated eDocument, the generated eDocument containing the types of data required for the associated country;

preparing the generated eDocument for communication with at least one of a cloud service provider and a partner service provider; and sending the generated eDocument to at least one of the cloud service and partner service provider.

2. The method of claim 1, wherein the mapping of the data to the received eDocument is performed within ERP software.

3. The method of claim 1, wherein the at least one of the source document, the maintained eDocument, and the at least one database includes at least one technical requirement, and wherein the at least one technical requirement is at least one of the country specific technical format requirement and an eDocument specific technical requirement.

4. The method of claim 1, wherein the at least one database comprises at least one of a global database and at least one country specific database; and wherein the at least one country specific database includes at least one eDocument specific database.

5. The method of claim 2, wherein the generated eDocument conforms to the at least one technical requirement.

6. The method of claim 1, wherein at least part of the eDocument processing is performed by an interface connector, wherein the interface connector is configured to perform the following:

mapping data to the received eDocument; and preparing the generated eDocument for sending.

7. The method of claim 1, wherein the communication between the system and the at least one of the cloud service provider and the partner service provider is implemented through web services.

8. The method of claim 1, wherein at least part of the preparing of the generated eDocument is performed by an application interface framework (AIF).

9. The method of claim 1, wherein the eDocument is implemented with at least one of the following databases:
an eDocument history database;
an eDocument file database;
an eDocument reference database; and
a country specific eDocument database.

10. The method of claim 2, further comprising:
responsive to receiving the generated eDocument from the system, the cloud service provider transmits the eDocument to a local authority of the country.

11. The method of claim 10, wherein the local authority determines if the generated eDocument satisfies the technical requirements.

12. The method of claim 5, wherein a selection of the interface connector is based on at least one of the following:
a specific interface technology;
a type of interface;
a type of cloud services provider.

13. A system for generating, sending, updating, and monitoring electronic documents (eDocuments), the system comprising:
a non-transitory computer-readable medium having data instructions, which when executed result in operations comprising:

receiving, by a processor manager module, an eDocument from at least one of a source document and a maintained eDocument, the eDocument comprising header information;

associating, by a document process module, the received eDocument with one of a plurality of countries based on the header information containing one or more country specific structures and to generate an eDocument on the basis of data from at least one of the source document, the maintained eDocument, and at least one database, wherein the generated eDocument includes a country specific technical format requirement for the associated country, the country specific technical format requirement defining types of data content required for the associated country, wherein the data content (i) is retrieved from one or more country specific databases that contain data relevant only to the associated country and (ii) does not include display of a country specific language;

mapping, by an interface connector, data to the received eDocument;

responsive to the mapping, generating an eDocument based on the data mapped to the received eDocument according to the country specific technical format requirement, the generated eDocument containing the types of data required for the associated country;

preparing, by the interface connector, the generated eDocument for transmission; and sending, by the interface connector, the generated eDocument to at least one of a cloud service provider and a partner service provider.

14. The system of claim 13, wherein the mapping of data to the received eDocument is performed within ERP software.

15. The system of claim 13, wherein the at least one of the source document, the maintained eDocument, and the at least one database includes at least one technical requirement, and wherein the technical requirements are at least one of country specific and eDocument specific.

16. The system of claim 13, wherein the at least one of the source document, the maintained eDocument, and the at least one database includes at least one technical requirement, and wherein the at least one technical requirement is at least one of a country specific technical format requirement and an eDocument specific technical requirement.

17. The system of claim 15, wherein the generated eDocument conforms to the at least one technical requirement.

18. The system of claim 13, wherein the eDocument is implemented with at least the following databases:
an eDocument history database;
an eDocument file database;
an eDocument reference database; and
a country specific eDocument database.

19. The system of claim 13, wherein the communication between the system and the at least one of the cloud service provider and the partner service provider is implemented through web services.

20. A non-transitory computer-readable medium storing program instructions that, when executed, cause a processor to execute operations to generate, send, update, and monitor electronic documents (eDocuments), the operations comprising:

receiving an eDocument from at least one of a source document and a maintained eDocument, the eDocument comprising header information;

associating the eDocument with one of a plurality of countries based on the header information containing one or more country specific structures;

responsive to the mapping, generating an eDocument based on the data mapped to the received eDocument according to the country specific technical format requirement;

mapping data to the received eDocument, wherein the data is based on at least one of the source document, the maintained eDocument, and at least one database, and includes a country specific technical format requirement for the associated country, the country specific technical format requirement defining types of data content required for the associated country, wherein the data content (i) is retrieved from one or more country specific databases that contain data relevant only to the associated country and (ii) does not include display of a country specific language;

responsive to the mapping, generating an eDocument based on the data mapped to a the received eDocument, the generated eDocument containing the types of data required for the associated country, wherein the generated eDocument includes a plurality of interactive buttons tailored to the associated country;

displaying the generated eDocument to a user interface to allow (i) monitoring, (ii) interacting, and (iii) updating of the generated eDocument in response to a selection of one of the plurality of interactive buttons tailored to the associated country;

preparing the generated eDocument for communication with at least one of a cloud service provider and a partner service provider; and sending the generated eDocument to at least one of the cloud service and partner service provider.

\* \* \* \* \*